United States Patent
Reimer et al.

(10) Patent No.: US 6,607,212 B1
(45) Date of Patent: Aug. 19, 2003

(54) COLLISION DEFORMATION SENSOR USING A SOURCE OF WAVE ENERGY FOR USE IN THE CRUSH ZONE OF A VEHICLE

(75) Inventors: Ernest M. Reimer, Oster Cove (CA); Lorna H. Baldwin, St. John's (CA)

(73) Assignee: Canpolar East Inc., St. John's (CA)

( * ) Notice: Subject to any disclaimer, the term of this patent is extended or adjusted under 35 U.S.C. 154(b) by 0 days.

(21) Appl. No.: 09/830,638

(22) PCT Filed: Nov. 26, 1999

(86) PCT No.: PCT/CA99/01135
§ 371 (c)(1),
(2), (4) Date: Apr. 27, 2001

(87) PCT Pub. No.: WO00/32449
PCT Pub. Date: Jun. 8, 2000

(30) Foreign Application Priority Data

Nov. 26, 1998 (CA) .............................................. 2254538

(51) Int. Cl.$^7$ ............................................. B60R 21/32
(52) U.S. Cl. .......................... 280/735; 180/274; 701/35
(58) Field of Search .......................... 280/735; 701/45; 180/274

(56) References Cited

U.S. PATENT DOCUMENTS

| | | | | |
|---|---|---|---|---|
| 4,735,212 A | | 4/1988 | Cohen .......................... 128/667 |
| 4,967,597 A | | 11/1990 | Yamada et al. ............ 73/516 R |
| 4,995,639 A | | 2/1991 | Breed .......................... 280/735 |
| 5,008,774 A | | 4/1991 | Bullis et al. .................. 361/283 |
| 5,026,984 A | | 6/1991 | Gerdt ..................... 250/227.21 |
| 5,350,189 A | | 9/1994 | Tsuchitani et al. ........ 280/728.1 |
| 5,351,542 A | | 10/1994 | Ichimura et al. ........... 73/517 R |
| 5,373,124 A | | 12/1994 | Abendroth et al. ... 200/61.45 R |
| 5,388,460 A | | 2/1995 | Sakurai et al. ............. 73/517 R |
| 5,412,986 A | | 5/1995 | Beringhause et al. ..... 73/517 R |
| 5,425,273 A | | 6/1995 | Chevalier .................... 73/705 |
| 5,436,838 A | | 7/1995 | Miyamori .............. 364/424.05 |
| 5,445,412 A | * | 8/1995 | Gillis et al. ................. 280/735 |
| 5,496,979 A | * | 3/1996 | Behr .................... 200/61.45 M |
| 5,502,301 A | * | 3/1996 | Lord ..................... 250/227.14 |
| 5,656,846 A | | 8/1997 | Yamada ...................... 257/420 |
| 5,676,851 A | | 10/1997 | Suzuki et al. ................... 216/2 |
| 5,719,333 A | | 2/1998 | Hosoi et al. .............. 73/514.05 |
| 5,748,567 A | | 5/1998 | Mori et al. .................. 367/178 |
| 5,917,180 A | * | 6/1999 | Reimer et al. ......... 250/227.14 |
| 5,983,725 A | * | 11/1999 | Fischer et al. ................. 73/705 |
| 6,009,970 A | * | 1/2000 | Breed ......................... 180/274 |
| 6,206,129 B1 | * | 3/2001 | Breed et al. ................. 180/274 |

FOREIGN PATENT DOCUMENTS

| | | |
|---|---|---|
| DE | 44 07 763 A1 | 9/1995 |
| EP | 0 420 494 A2 | 3/1991 |
| EP | 744 595 A1 | 11/1996 |
| JP | 62294928 | 12/1987 |
| WO | WO 99/04234 | 1/1999 |
| WO | WO 00/32449 | 6/2000 |

* cited by examiner

Primary Examiner—Lesley D. Morris
Assistant Examiner—L. Lum
(74) Attorney, Agent, or Firm—Spencer Fane Britt & Browne LLP

(57) ABSTRACT

A collision deformation sensor for use within the crush zone of a vehicle consists of first and second spaced apart substrates for mounting to or forming respective vehicle components, with a compressible carrier medium filling the space between the substrates. The carrier medium is formed from a material transparent or translucent to light or other wave energy, and includes wave energy scattering centers dispersed within the medium to create a scattered energy volume. Alternatively the carrier medium forms a hollow cavity, the inside surface of which is coated with a wave energy dispersion coating. A source and receiver of light or other wave energy communicates with the carrier medium. Signal couplings and processors are associated with the source and receiver. The device operates on the principle whereby compression of the space between the substrates increases the intensity of a light or other wave energy, and this increase is detected by the receiver and signal processor, which in turn activates an air bag, or seat belt tightener or the like.

18 Claims, 7 Drawing Sheets

COLLISION DEFORMATION SENSOR USING A SOURCE OF WAVE ENERGY FOR USE IN THE CRUSH ZONE OF A VEHICLE

Priority benefit under 35 U.S.C. § 120 is claimed to Canadian Patent 2,254,538 filed Nov. 26, 1998 and Patent Cooperation Treaty Application No. PCT/CA/01135 filed Nov. 21, 2000.

FIELD OF THE INVENTION

The present invention relates to sensors for detecting vehicle impact, for the deployment of air bags or other responses to a vehicle collision. The invention further relates to impact detection systems and vehicles incorporating same. In particular, the invention relates to a deformation sensor installed within the crush zone of a vehicle, which operates by sensing changes in intensity of light or other waveform energy, within a carrier medium, wherein the local intensity of the lighting increases in the event of deformation of the medium.

BACKGROUND OF THE INVENTION

Impact detection devices comprise an important element of the safety system of modern vehicles. The advent of air bags and automatic belt tighteners in particular have given rise to a need for accurate and responsive impact detection means. Desirably, detection means for vehicle use are relatively inexpensive. Further, it is essential that the sensors be highly reliable, and not be adversely affected by corrosion, temperature changes, altitude, etc.

Collision or impact sensors conventionally employ an accelerometer located in vehicle mid-body of the passenger compartment to detect rapid changes in vehicle velocity. However, these arrangements do not provide adequate information in respect of the location and severity of a collision event. The design and activation or increasingly sophisticated occupant restraint systems such as multiple air bags and seat belt tighteners render it important to sense the dynamics of an impact event in order to properly control the restraint devices. A greater degree of sensitivity and accuracy may be achieved through the use of crush zone sensors, which can be used to detect abrupt velocity changes within one or more of the impact zones of a vehicle. The crush zones are the regions within the vehicle which experience substantial deformation in the event of an impact, and which typically experiences a greater deceleration than the non-crush zone. The latter zone typically houses the passenger compartment. The crush zones typically comprise the trunk and engine compartments and the exterior regions of the door and side panels.

Conventional vehicle impact sensors include "ball-in-tube" sensors and "inertia" sensors. The ball-in-tube type sensor consists of a hermetically sealed housing, which encloses and surrounds a cylinder. A sensing ball-shaped piston is disposed within the cylinder, and the housing is filled with a damping gas. The piston includes electrically conductive elements. The piston resists movement within the cylinder, conventionally by means of a spring. When the device experiments a sufficient velocity change, the force experienced by the piston overcomes the countervailing bias exerted by the spring and displaces the piston within the cylinder. In addition to the force of the spring, the piston is also exposed to a damping force exerted by ambient damping gas, resulting from the pressure differential that exists once the piston has moved a specific distance within the cylinder. If the vehicle deceleration is sufficiently large in magnitude and long enough in duration to overcome both the damping force and the spring-biasing force, the piston will move to a position where contact is made with a circuit that will activate the air bag or other safety system.

An inertia type sensor operates on a similar principle, and comprises a moveable element, which is moveable relative to a static element. In one conventional version, an inertia sensor comprises a "rollamatic" type sensor, which comprises a nearly frictionless mechanism consisting of two or more rollers inserted within the loops of a flexible band, with the band acting to turn the rollers whose movement can be directed to perform various functions. The moveable element is held in place by the tension of the band and a surrounding housing. In the event of a collision or other sudden deceleration or acceleration, the resulting force displaces the moveable element. If the force is great enough in duration and magnitude, the moveable element will move a predetermined distance to a pin, which will be hit or dislodged, activating the air bag or other safety system.

Various other sensors have been proposed for use within crush zones, including simple electrical switches, electronic pressure switches, and rod and tube sensors. Conventionally, these sensors have been positioned at the outermost extremities of the crush zone. Other deformation centers have been described, particularly for lateral impact situations. These sensors detect either deformation extent of deformation velocity or, in some cases, a combination of both but with very limited resolution. In one aspect, sensors detect the extent of crushing of the vehicle itself as an indicator of the crash severity or velocity change. Such sensors conventionally initiate safety systems if the crush zone deforms to the extent that it makes contact with the sensor, which has been appropriately positioned within the vehicle. Typically, multiple deformation sensors are mounted at various locations within the vehicle.

Deformation sensors mounted within the vehicle crush zone conventionally operate by mounting a switch within the crush zone which when the vehicle experiences a sufficient impact, forces two elements of the switch together to create an electrical contact. For example, a fiber optic type switch may be mounted within the contact zone (See U.S. Pat. No. 4,988,862). Alternatively, two spaced apart conductors separated by an elastic member may be mounted within the crush zone, with the conductors contacting each other upon experiencing a sufficient impact. (See U.S. Pat. No. 4,995,639).

A further type of collision sensor is disclosed in Germany laid open application DE 4407763 A1 (Robert Bosch GmbH). This arrangement comprises a collision deformation sensor for mounting within the crush zone of a vehicle comprising first and second spaced apart substrates, each of which may be mounted to or comprise a corresponding vehicle component within the crush zone. Between the substrates, means are provided for detecting convergence of the substrates and to generate an electronic signal in response to the detected convergence. Means are also provided which are responsive to the electronic signal, for actuating an occupant restraint system. The detection means relies on a light guide, which becomes deformed when the substrates converge. Deformation of the light guide caused by crushing of the vehicle releases a portion of the light traveling through the guide out the side walls thereby attenuating the light intensity reaching the light detector.

None of these conventional arrangements are entirely suitable for detecting velocity changes within the crush zone of a vehicle in a manner suitable for sensing all or most potentially injurious accidents. In particular, inertial sensors have been found to trigger air bag restraint systems on short duration acceleration pulses, but not on longer duration pulses. As well, the ball-in-tube type sensor has had little success when responding to vertical and lateral acceleration, and only responds relatively well to longitudinal deceleration. Further, the ball-in-tube sensor may be adversely affected by temperature, with extremes of temperature adversely effecting the viscosity of the damping gas within the sealed housing.

A drawback within many prior art sensors resides in the risk of accidental triggering in response to a non-destructive or non-injurious impact. It is desirable to provide a deformation sensor which is integral to the primary structure of the vehicle and will with a high reliability not respond to any event other than an actual deformation of the structural and/or energy absorbing members of the vehicle. It is further desirable to provide a sensor that is highly reliable in adverse environments and relatively inexpensive to mass produce.

A drawback within many prior art sensors resides in the risk of accidental triggering in response to a non-destructive or non-injurious impact. It is desirable to provide a deformation sensor which is integral to the primary structure of the vehicle and will with a high reliability not respond to any event other than an actual deformation of the structural and/or energy absorbing members of the vehicle. It is further desirable to provide a sensor that is highly reliable in adverse environments and relatively inexpensive to mass produce.

Superior impact detection to address the above goals may be achieved through the use of a sensor which operates according to light or other wave energy scattering principles, rather than strictly electrical and/or mechanical means.

Within applicant's previous PCT International application no. PCT/CA98/00686 there is disclosed a pressure sensor of general application, referred to herein as an "integrating cavity" pressure sensor. This sensor which operates according to the principle whereby the intensity of light or other wave energy dispersed and scattering within an integrating cavity is increased as the region within which the energy is dispersed is diminished. According to this principle, a pressure sensor may comprise a compressible carrier medium of light or other wave energy, containing scattering centers for disbursing the light within the carrier medium. Wave energy source receiving means are associated with the carrier medium to transmit and receive, respectively, the wave energy to and from the carrier medium.

The term "light" will for convenience be generally used herein in reference to wave energy of any suitable type. It will be understood that other forms of wave energy including electromagnetic radiation in the non-visible spectra and sound may comprise the wave energy for use in the present invention.

The carrier medium of the integrating cavity-type sensor may be enclosed within a flexible envelope or a compressible housing or the like. Pressure applied to the envelope or housing compresses the carrier medium, thereby increasing the intensity of the light within the region surrounding the light source, in proportion to the decrease in volume of the carrier medium. The change in light intensity is detected by the receiver, which transmits the information to a signal processing means. The carrier medium is transparent or translucent to the particular light or wave frequency, and preferably includes multiple light scattering centers evenly disbursed throughout the medium. For example the medium may comprise a translucent foam material. Alternatively, the integrating cavity comprises a hollow chamber, the interior face of the chamber walls having light reflective and dispersive properties which fully diffuse any light entering the chamber to provide the light dispersion function. The enclosure comprises or forms an integrating optical cavity, which is defined as a region or volume either bounded by an enclosure and/or comprising a deformable material with the characteristic whereby illumination within the cavity undergoes multiple scattering reflections or refractions to thereby become effectively randomized and smoothed out in its distribution throughout the cavity. In such the cavity, at the limit, information about the original direction of illumination is eventually lost. An integrating optical cavity may be an air or gas filled enclosure, or may be a volume within a translucent solid such as a cellular matrix that provides optical scattering centers.

It is a characteristic of such a cavity that, for a light source with a constant power output, the light intensity within the cavity is a function of the volume of the cavity, the position of the light source and either the reflectance of the walls of the envelope or the density of scattering centers within the carrier medium. A reduction in the volume of the cavity causes a corresponding increase in the light intensity within the cavity. The cavity may be formed with virtually any shape, although certain extreme shapes may not respond ideally.

A pressure sensor of this type may take several convenient forms that are suitable for the purposes of the present invention. For example, the sensor may comprise an elongate, flattened member featuring multiple light sources and receivers. Alternatively, the scattering medium may comprise a block of foam shaped to fit within a defined cavity or receiving space.

The present invention relates to detection of vehicle impacts which are categorized as "severe". This refers to impacts in which serious injury or death to one or more vehicle occupants is reasonably likely.

SUMMARY OF THE INVENTION

It is an object of the invention to provide a vehicle component comprising a sensing or detector means for detection of a vehicle impact, whereby the risk of accidental triggering is minimized. It is a further object to provide an impact sensor specifically adapted to detect actual deformation of the crush zone of a vehicle or other components of the vehicle, indicative of severe impact. to provide such detection by sensing means that minimize electrical and moving elements and components.

In accordance with the objects recited above, the present invention is a sensor for detecting deformation of a vehicle crush zone, of the general type comprising spaced apart substrates, which may comprise vehicle components with a means between the substrates to detect convergence and trigger an appropriate response such as an airbag or seatbelt tensioners. The invention is for detecting vehicle impacts rated as severe. In one aspect, the invention comprises:

a) a compressible carrier medium of wave energy transmitting material such as a polymeric foam having wave energy scattering centers disbursed therein;

b) a wave energy source in communication with the carrier medium, to provide a scattered energy volume within the medium containing fully scattered wave energy;

c) a wave energy receiver for detecting the integrated intensity of the fully scattered wave energy; and d) signal coupling means to operatively connect the receiver with signal processing means for triggering an occupant restraint system when the receiver detects a change in said integrated intensity indicating a converging of the substrates, and a consequent compression of the carrier medium, at or above an extent indicative of a severe impact of said vehicle.

Preferably, the wave energy comprises light, and the carrier medium comprises a translucent foam material.

In a further aspect, the energy source and receiver comprise a fiber optic light source, associated with a fiber optic receiver in close proximity thereto. In a further aspect, multiple paired fiber optic light sources and receivers are provided within a fiber optic array.

Alternatively, the light source may comprise one or more LED units in proximity to the carrier medium, and the receivers may comprise photoreceptors. The LED's and photoreceptors may be mounted to a circuit board in contact with the carrier medium.

In a further aspect, the invention comprises a vehicle bumper, having a rigid bumper support comprising the first substrate member, a bumper skin spaced apart from the support and comprising the second substrate member, whereby a hollow region is defined between the bumper skin and support. The hollow region is at least partly filled with an energy absorbing material comprising the carrier medium, which conveniently comprises translucent foam. At least one light source and receiver communicate with the carrier medium. Preferably, the light source and receiver are in close proximity to, in contact with, or embedded within the foam. Conveniently the source and receiver comprise a linear array of fiber optic or LED light sources and receivers mounted to the bumper support. In one version, fiber optic transmitters and receivers are individually associated with a control module, which comprises a light source communicating with the fiber optic cables. The module further comprises signal coupling means for receiving transmitted light from the fiber optic receivers and signal processing means for converting the intensity of the received light into a signal indicative of deformation of the carrier medium in the region surrounding the energy sources and receivers. Alternatively, the module communicates with a circuit board supporting an array of LED's and photoreceptors in contact with the carrier medium.

In a further aspect, the invention comprises a vehicle panel, such as a door panel or other structural element, comprising a rigid frame element and a skin spaced apart therefrom, with the hollow region between the skin and frame element being at least partly filled with the deformable carrier medium, which preferably comprises a translucent foam material. One or more light sources and receivers as described above are mounted within the panel in contact with or communicating with the carrier medium, and preferably mounted to the frame element. A control module as described above is associated with the energy sources and receivers.

In a further aspect, the invention comprises a vehicle frame element, comprising a hollow vehicle structural member at least partly and preferably completely filled with said carrier medium, which preferably comprises a translucent foam material. A light source and receiver means, as characterized above, communicates with the carrier medium and is associated with a processor module as characterized above.

In a further aspect, the invention comprises a deformation sensor for installation within a vehicle, for detecting compressive forces between two relatively closely spaced vehicle components. In this aspect, the invention comprises a pair of spaced apart parallel plates, with the region between the plates filled with the carrier medium, preferably comprising translucent foam. Each plate is associated with a corresponding vehicle component whereby any convergence of the vehicle components, such as would occur in a collision for example, compresses the interstitial foam between the plates. Preferably, the lateral edges of the hollow region are bounded by constraining members for fully enclosing the space between the plates and retaining the foam fully between the outer plates. One or more light sources and receivers as described above are positioned within the carrier medium or otherwise coupled to or communicating with the carrier medium. The receiver or receivers are linked to a processor module.

In a further aspect, the invention comprises a longitudinal deformation sensor, for detection of relative displacement of comparatively widely separated vehicle components. In this aspect, the invention comprises an elongate hollow cylinder, the bore of which is partly filled with the carrier medium. One end of the cylinder is sealed. The carrier medium is retained within the cylinder by a slidable cylinder plunger disposed within the hollow bore of the cylinder and in contact with the carrier medium. One or more light sources and receivers as described above is positioned within the cylinder in contact with or communicating with the carrier medium, and preferably mounted adjacent the base of the cylinder. The cylinder body and bore are each mounted to respective vehicle components. Displacement of the associated vehicle components towards each other displaces the plunger within the cylinder, thereby compressing the carrier medium and signaling an impact event. A processor module associated with the energy sources and receivers may be positioned either within the interior of the cylinder or externally thereof.

In a further aspect, the invention comprises a vehicle, having an air bag or other impact response means, and one or more deformation sensors as described above mounted within the vehicle and operatively connected to the response means.

In a further aspect, the invention comprises a method for detection of a severe impact against a vehicle, of the type comprising the steps of providing a vehicle having incorporated therein a deformation sensor within a crush zone of the vehicle and communicating between the sensor and an occupant restraint system when said sensor detects a severe impact. The invention is characterized by the steps of:

a) providing a deformation sensor of the general type described above, comprising a compressible carrier medium, a light emitter and receiver, signal coupling means and signal processing means; providing such a sensor within the vehicle linking two vehicle components within the crush zone of the vehicle;

b) transmitting light from a source to a deformable carrier medium within said sensor to form an optical cavity defined by a region with said medium within which light from said source is fully scattered;

c) detecting the intensity of fully scattered and integrated light within said optical cavity and transmitting a resulting signal to signal processing means;

d) converting within said signal processing means said integrated light intensity level into an output electrical signal;

e) actuating an occupant restraint system upon detection of a change in said integrated light intensity within said optical cavity indicative of crushing together of said vehicle components indicative of a severe impact experienced by said vehicle.

DETAILED DESCRIPTION OF THE PREFERRED EMBODIMENT

The present invention comprises in general terms a deformation sensor mounted within a strategic position within the crush zone of a vehicle. The sensor may be incorporated within a vehicle as an integral component of a functional or structural portion of the vehicle.

Figure 1:
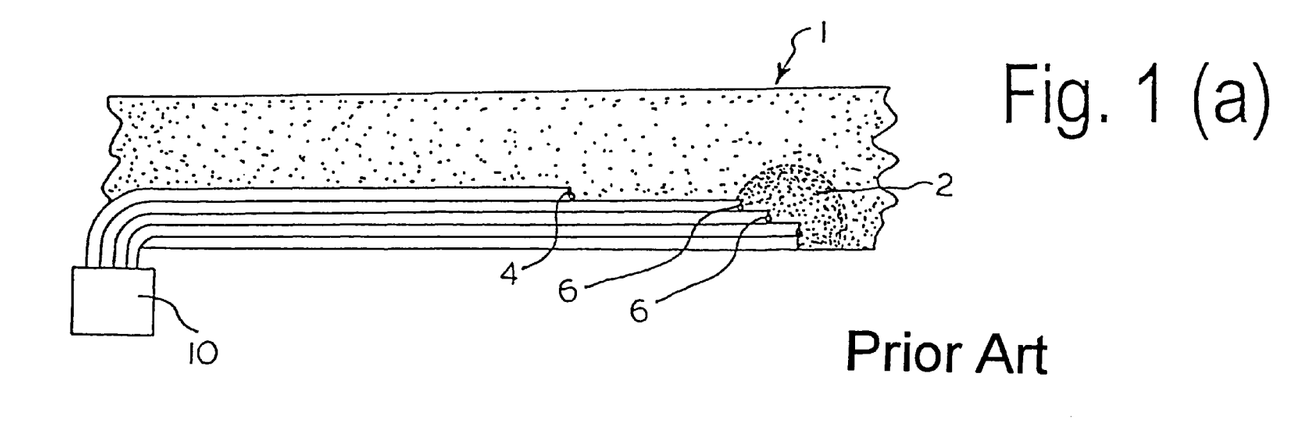
FIGS. 1(a) and 1(b) are schematic sectional views of a portion of a prior art deformation sensor of the type which is adapted for use in the present invention.

FIGS. 1(a) and 1(b) show a prior art sensor of the type generally described in PCT/CA98/00686 and known as an "integrating cavity" sensor. The present invention incorporates a sensor of this general type. An integrating cavity pressure sensor 1 comprises in general terms a carrier 2 comprised of a volume of light-scattering material. Conveniently, the material may comprise an open or closed cell translucent foam. Multiple spaced apart light sources 4 provide uninterrupted and fully scattered illumination of a region within the foam. The carrier interior is illuminated by a fiber optic cable 6, one end of which is connected to a light source and the second end terminates within or against the foam body 2. A second optical fiber 8 bundled with the first fiber comprises a light receptor for detection of the intensity of light within the foam. A second end of the receptor communicates with signal processing means 10. The light sources illuminate a region within the interior of the foam with a predetermined intensity, with the light within this region being fully scattered by scattering centers within the foam, such as cellular walls within the foam. The light sources and receivers are associated with a support matrix comprising an elongate illumination strip 6. Compression of the foam increases the intensity within the region by a predetermined amount varying with the extent of deformation, as illustrated schematically in FIG. 1(b).

An optic fiber 6 may be associated with a light source comprising a conventional bulb or an LED within the processing means 10, powered for uninterrupted illumination by a vehicle electrical power source or a separate power source. Preferably, a warning light viewable by the vehicle operator is associated with the light source, and indicates to the operator when the light source burns out or otherwise is not operating.

Figure 2:
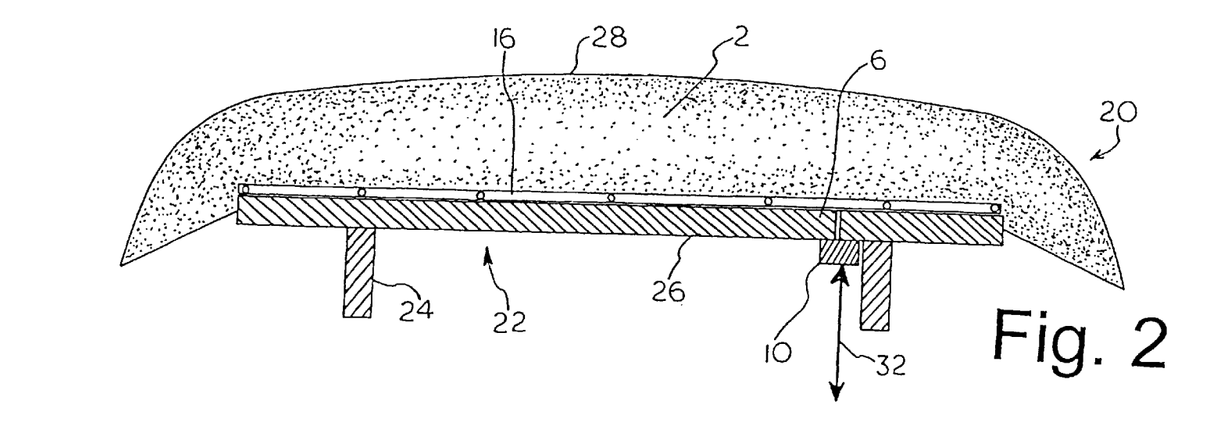
FIG. 2 is a sectional view of a vehicle bumper incorporating the present invention.

Turning to FIG. 2, the present invention comprises in one aspect a vehicle bumper 20 incorporating the present invention. The bumper comprises a rigid bumper armature 22, featuring spacers 24 mounted to the vehicle frame (not shown) and an elongate rigid support 26 spanning the arms. A bumper skin 28 is mounted to the armature, and comprises a flexible envelope filled with an energy absorbing translucent foam core 2. An illumination strip 16 is mounted to the bumper support and extends substantially the length thereof. Illumination strip 16 is formed from an array of fibre optic cables, which serve as both light sources and receivers in a staggered array. The optic cables extend into an electronic microprocessor module 10, mounted to the bumper armature. The microprocessor module includes information and signal processing means, described in greater detail below, whereby optical signals from the sensor are converted into electronic signals. A power and communications connection 32 connects the microprocessor module 10 with a power source, not shown, and one or more air bags or other safety devices (not shown), as will be described in greater detail below. The module also includes one or more light emitters for transmission by the light source fiber optic cables.

Figure 3:
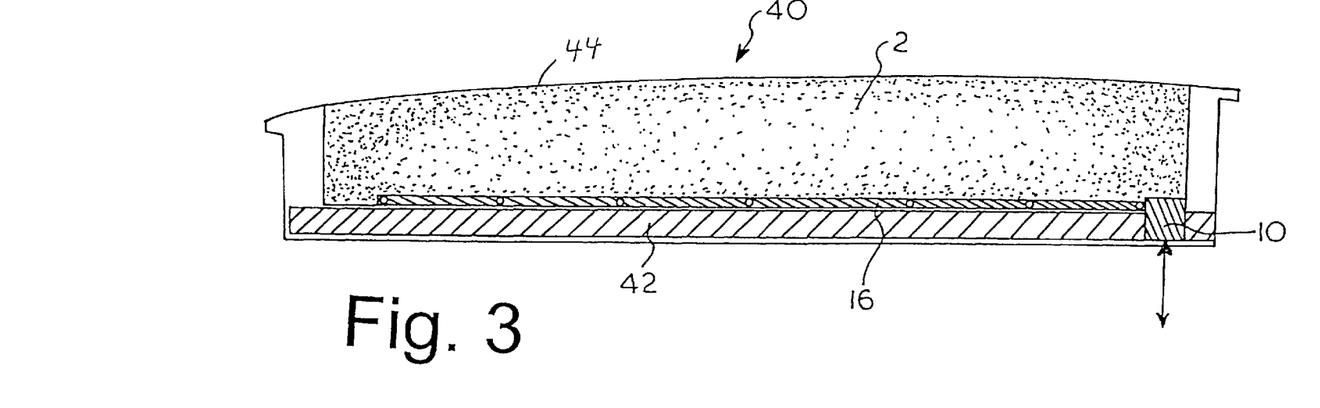
FIG. 3 is a sectional view of a vehicle door panel incorporating the invention.

FIG. 3 illustrates a vehicle door panel 40 incorporating a pressure sensor according to the present invention. The panel comprises a reinforcing bar 42 at an inside portion of the panel, and an outer skin 44. Energy absorbing translucent foam 2 is positioned within the skin. An illumination strip 16 is mounted to the reinforcing bar 42, and in communication with the energy absorbing foam 2. Illumination strip 16 is formed from optic fibers as described above. The illumination strip 16 communicates with a microprocessor module 10 having the same features as described above. The microprocessor module communicates with a power source and air bags or like safety devices, not shown.

Figure 4:
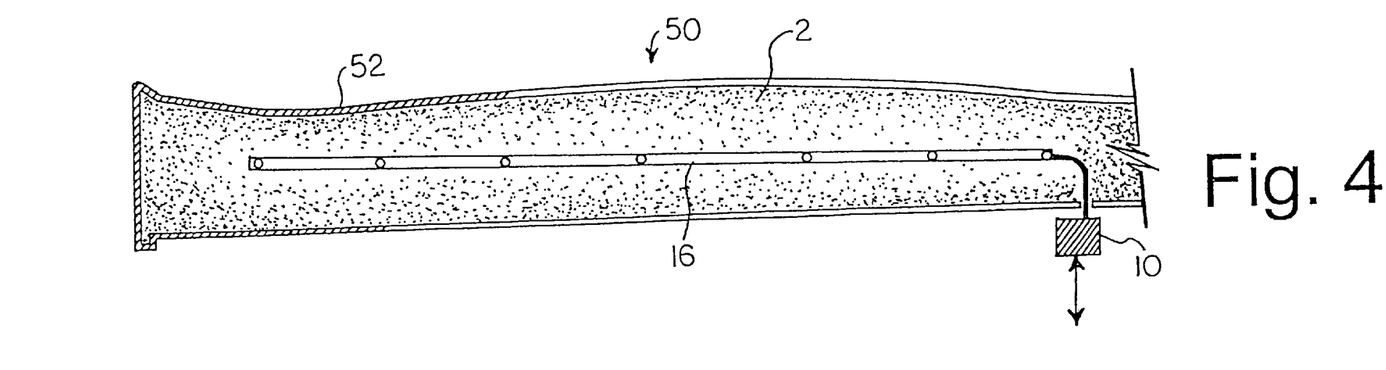
FIG. 4 is a sectional view of a vehicle frame member incorporating the invention.

FIG. 4 illustrates a structural frame element 50 of a vehicle incorporating a pressure sensor. The frame element may comprise any selected vehicle frame member such as a vehicle roll bar, door pillar or other member. The frame member comprises a rigid outer shell 52, having a hollow space therein. The interior of the member is filled with a light scattering foam. Disposed within the interior of the frame, and extending substantially or partially the length of the frame member is an illumination strip as described above. The microprocessor module 10 is linked to the strip, and is mounted either directly to the frame member, or elsewhere within the vehicle. The module is in turn linked to a power source and an air bag or other like safety feature.

Figure 5:
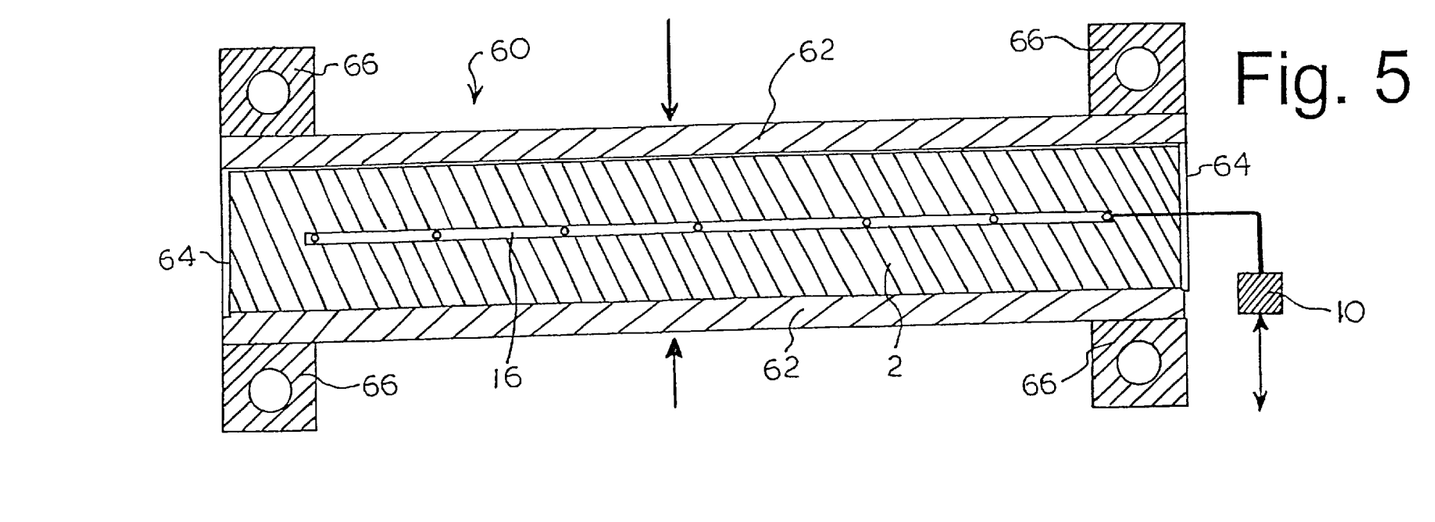
FIG. 5 is a sectional view of a sensor according to a second embodiment of the invention.

FIG. 5 illustrates a first version of a non-integral deformation sensor 60 for mounting between two vehicle components. For example, such a sensor may be mounted between two vehicle frame members for detecting a converging of the members indicative of a vehicle impact. This version of the sensor is referred to herein as a "lateral" sensor, since it has a broad, shallow region of compression. In this version, the sensor has a first elongate axis and second relatively short transverse axis. The sensor primarily detects deformation along the transverse axis. The sensor comprises a cell, composed of first and second spaced apart parallel rigid plates 62, with the side edges of the plates 62 bounded by compressible or resilient wall 64 to defined an enclosed interior space between the plates. The interior space is substantially filled with an optical foam core 2. An illumination strip 16 is housed within the interior space, in contact with the foam. Mounting brackets 66 on the plates permit the respective plates to mount to two relatively closely spaced vehicle components, wherein relative displacement of the vehicle components indicates a severe impact. As described above, a microprocessor module 10 is linked to the fiber optic array, and is in turn linked to a power source and one or more air bags or the like. The module may be mounted directly to the vehicle component, or elsewhere within the vehicle.

Figure 6:
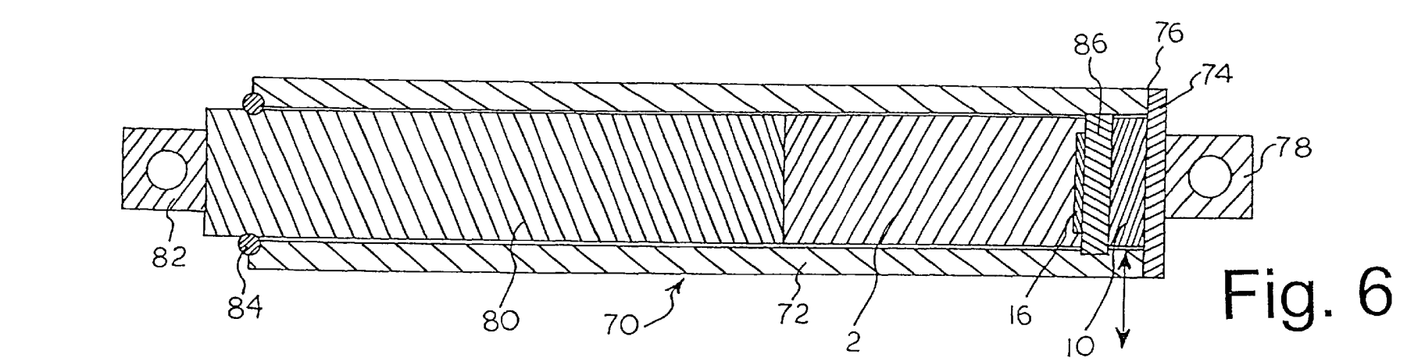
FIG. 6 is a sectional view of a sensor according to a third embodiment of the invention.

FIG. 6 illustrates a second type of non-integral sensor, comprising longitudinal deformation sensor 70 having an elongate axis, which may be mounted within the crush zone of a vehicle. This second sensor type may be mounted between relatively widely spaced frame elements within the engine compartment, whereby upon deformation of the engine compartment, the frame elements are displaced towards each other, with the displacement being detected by the sensor. In this embodiment, the deformation sensor comprises a rigid cylindrical hollow cylinder 72, one end of which is capped by a cap 74, which in turn is sealed to the cylinder by means of a seal 76. A tab 78 extends from the cap for mounting of the first end of the cylinder to a first component within the vehicle. A plunger 80 is slidably disposed within the cylinder, with the outwardly-extending end of the plunger featuring a second tab 82, for mounting to a second component of the vehicle. The plunger is retained within the cylinder by means of an annular seal 84 disposed within the second, open end of the cylinder, and contacting the plunger. The hollow interior base of the cylinder, between the cap and the plunger, is filled with a light scattering foam 2. An illumination strip 16 as generally described above is disposed within the hollow interior space, and conveniently may be mounted to a rigid interior plug 86 mounted within the cylinder spaced apart from the cap 74. The illumination strip is operatively connected to a microprocessor module 10, as described above, which in turn is associated with a power source and one or more air bags or the like (not shown). The microprocessor module is conveniently mounted within the interior of the cylinder, within a space between the plug 86 and cap 74. When the vehicle experiences a sufficient impact to deform the crush zone, the plunger is urged inwardly within the cylinder, thereby compressing the optical foam and increasing the light intensity within the foam by a proportionate amount.

Figure 7:
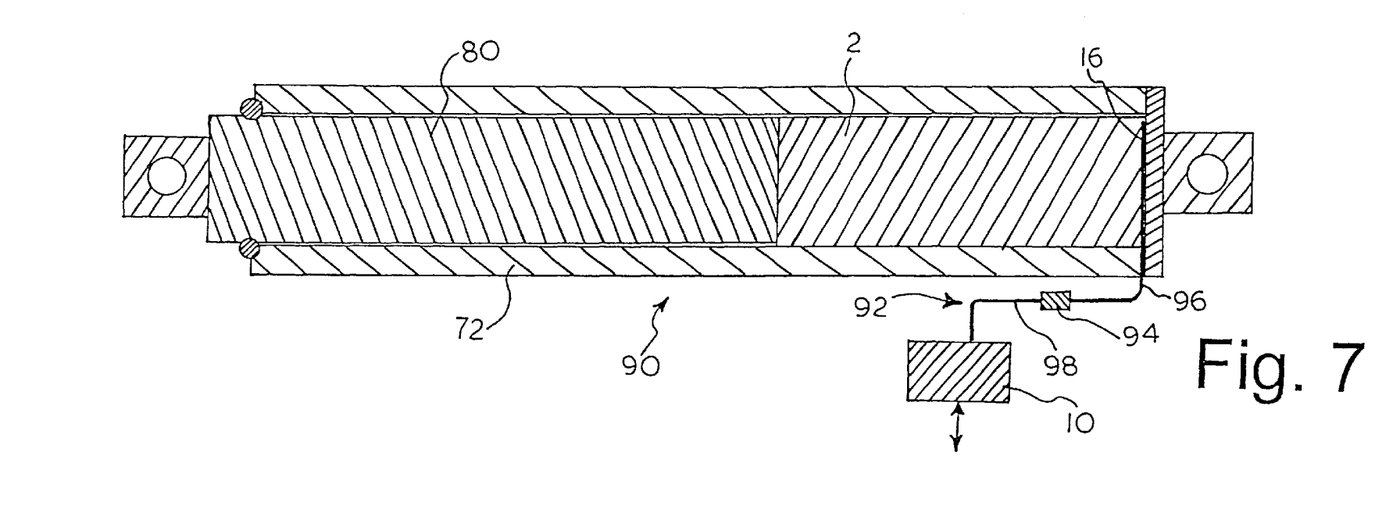
FIG. 7 is a sectional view according to FIG. 6, of a fourth embodiment of the invention.

Turning to FIG. 7, a variant 90 of the embodiment illustrated in FIG. 6 is disclosed, wherein the fiber optic array is mounted directly to the base of the cylinder 72, thereby dispensing with the plug 86 shown in FIG. 6. In this version, the fiber optic connection 92 between the microprocessor and the fiber optic array extends through the cylinder wall, with the microprocessor module 10 being mounted externally of the cylinder, within the vehicle compartment. A fiber optic connector 94 joins together a first fiber optic line 96 leading to the fiber optic array 16 within the cylinder, to a second fiber optic line 98 leading to the microprocessor module.

Figure 8:
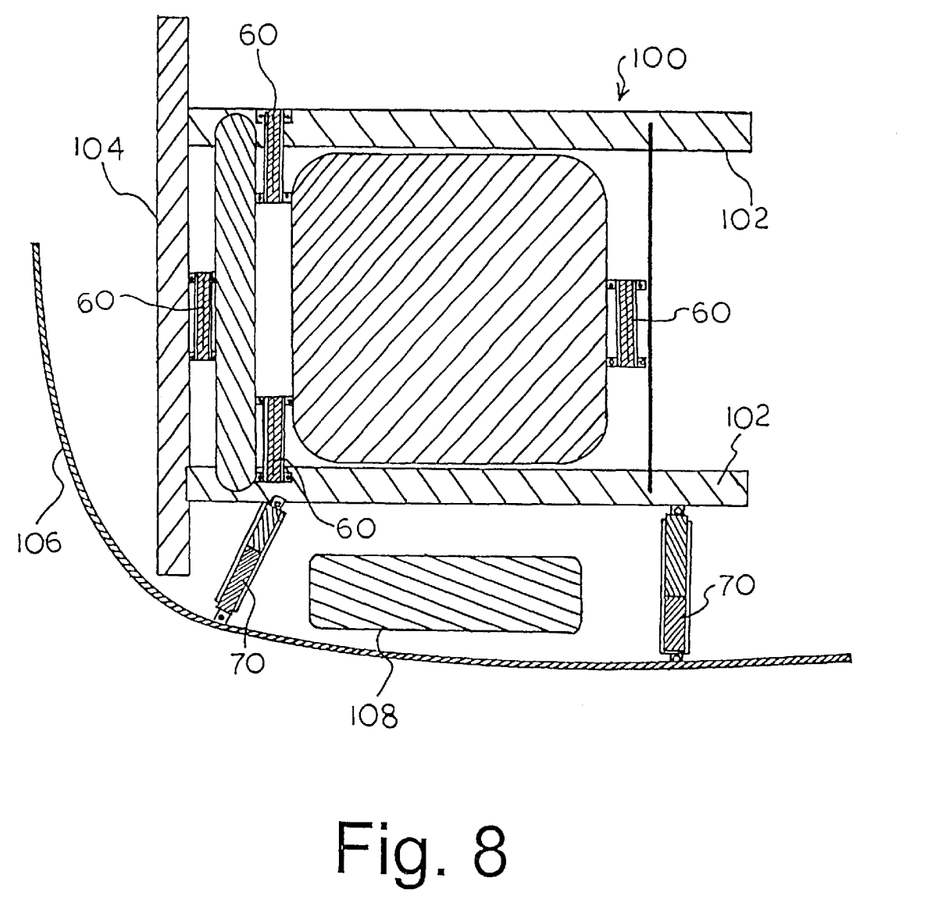
FIG. 8 is a schematic view of a portion of a vehicle, namely a vehicle engine compartment and surrounding components illustrating an aspect of the invention.

Turning to FIG. 8, a typical installation for an array of deformation sensors within the crush zone of a vehicle 100 is illustrated, in this case a vehicle engine compartment and surrounding components. The crush zone comprises a vehicle frame 102, bumper armature 104 and automobile body skin 106. The engine is mounted to the vehicle frame. One of the vehicle wheels 108 is illustrated, with the second wheel being removed for clarity. One or more side-mounted longitudinal type deformation sensors 70 join the vehicle frame with the body shell, in the region surrounding the front wheel. Further, multiple lateral type sensors 60 are positioned strategically within and around the engine compartment, for example between the engine and frame at the front portion of the engine, between the rear of the engine and a transverse frame element, and between the engine radiator and the front bumper armature. With this arrangement, a severe frontal or lateral impact against the crush zone of the vehicle will trigger one or more of the deformation sensors, for signaling impact information to the central processing unit, as described below.

Figure 9:
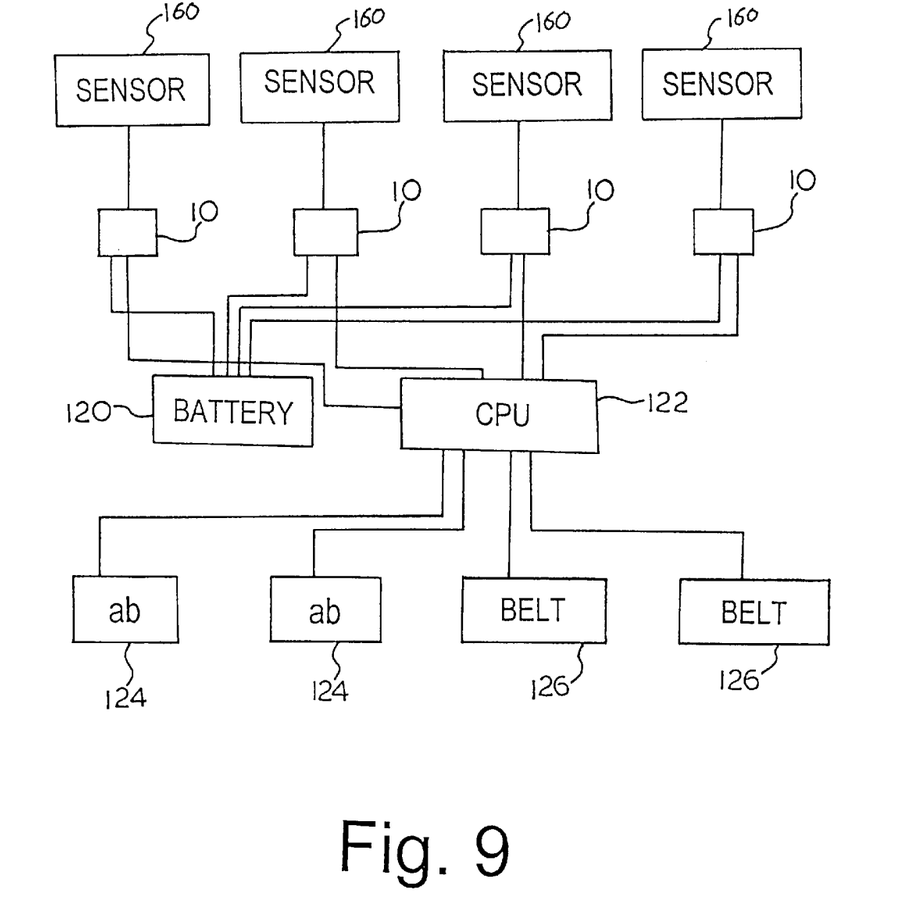
FIG. 9 is a schematic view of an array of sensors and associated controls and related components.

FIG. 9 is a schematic drawing illustrating an array of deformation sensors, a central control unit and an air bag or the like. An array of deformation sensors 160, which may be of any one or more of the variants disclosed herein, are mounted strategically within one or more crush zones of a vehicle. Each sensor 160 is associated with a corresponding microprocessor module 10. The microprocessor modules are each connected to a common power source 120, which conveniently comprises the vehicle battery, and a common central processing unit 122. The central processing unit is in turn connected to one or more air bags 124, seat belt tightening means 126 or other impact response means. Preferably, the central processing unit controls the air bags or the like in such a manner that the air bags are selectively deployed in response to the direction and/or extent of impact. Accordingly, a lessor impact will result in a reduced air bag inflation amount.

Further, an impact received from a particular direction may result in triggering of the air bags only on a signal side of the vehicle. For example, an impact experienced at one side of a bumper might result in a corresponding signal being transmitted from the detectors at that side of the bumper. Depending on the severity of the impact, response devices might be deployed only at one side. Alternatively, varying responses may be triggered, depending on the direction and severity of impact. For example, any combination of belt tightening and single or multiple air bag deployment may be triggered.

Figure 10A:
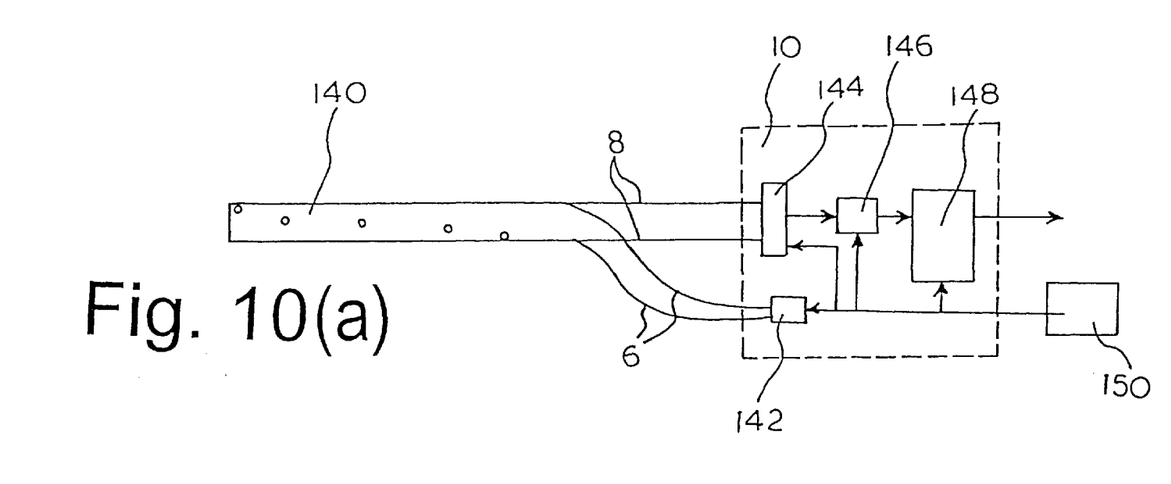
FIGS. 10(a) and 10(b) are schematic views of an illumination strip and associated processor components.
Figure 10B:
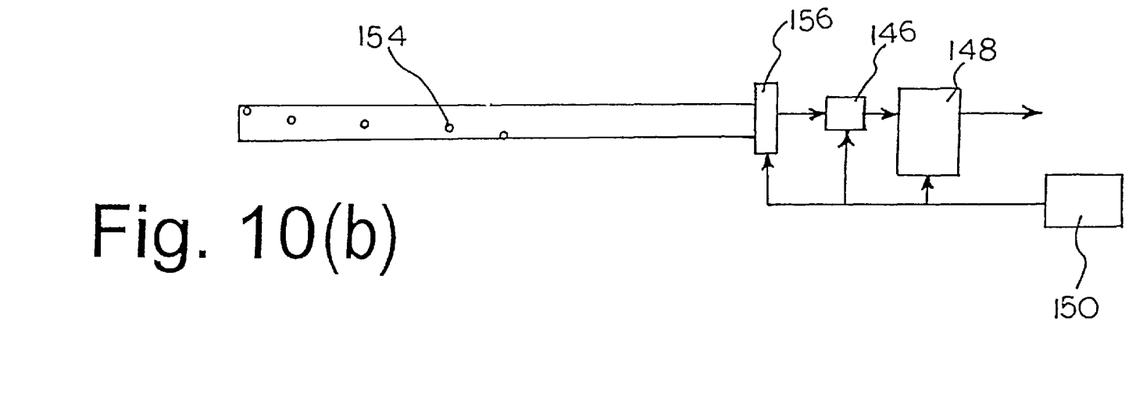

FIGS. 10(a) and 10(b) illustrate in schematic form two variants of the illumination strip, shown as reference 16 in connection with the embodiments described above and associated control means shown as reference no. 10. FIG. 10(a) illustrates a fiber optic mediated illumination and detection arrangement, wherein the strip comprises a fiber optic ribbon cable 140, comprising an array of transmitter and receiver fiber optic pairs. The ribbon cable 140 enters the processing means 10. The emitter fibers 6 communicate with an LED light source 142 within the processing means 10, and the receiver fibers 8 are coupled to a photo detector array 144. The signals from the photo detector array pass through an analog/digital converter 146, which in turn communicates with a micro controller 148 for interpretation of signals communicated by the array 144. The micro controller communicates with a conventional air bag controller, not shown. The above elements are powered by a power source 150.

Turning to FIG. 10(b), a non-fiber optic mediated arrangement is illustrated. In this version, the illumination strip comprises a rigid or flexible circuit board 152. The circuit board supports an array of LED/photo detector pairs 154, which in turn communicate with a multiplexer 156. Signals from the multiplexer are transmitted through an analog/digital converter into a microcontroller, and subsequently an air bag controller, as above. The above elements are powered by a power source 150 in the same manner as above.

Either of the arrangements of the illumination strips shown in FIGS. 10(a) and 10(b) may be adapted for inclusion in any of the sensor arrangements described herein.

The embodiments illustrated in FIGS. 5 and 6 are intended specifically to comprise rate or attitude configurations. Rate sensors detect rate of turn by detecting rotational accelerations or centrifugal accelerations. Attitude or inclination sensors operate by detecting off-axis gravitational accelerations. For automotive applications, these sensors are tuned for optimal operation at accelerations in the order of +/−1 g.

Although the present invention has been described herein by way of detailed descriptions of preferred embodiments of the invention, it will be understood by persons skilled in the art to which this invention relates that departures and variations of these embodiments will be encompassed by the present invention. The full scope of the invention, as defined in the claims, embraces such departures and variations.

What is claimed is:

1. A collision deformation sensor for mounting within a crush zone of a vehicle, said sensor comprising first and second spaced apart substrates (26, 28) within said vehicle crush zone and a means for detecting convergence of said substrates indicative of crushing of said crush zone and generating an electronic signal in response thereto, and means (10) responsive to said electronic signal for actuating an occupant restraint system; characterized by said means for detecting convergence comprising:
   a) a compressible carrier medium (2) of wave energy transmitting material having wave energy scattering centers disbursed therein;
   b) a wave energy source (4, 6) in communication with said carrier medium, to beam wave energy into said medium, to provide a scattered energy volume within said medium containing fully scattered wave energy;
   c) a wave energy receiver (8) for detecting an intensity of said fully scattered wave energy; and
   d) signal coupling means (8) to operatively connect said receiver with signal processing means (10) for triggering said occupant restraint system when said receiver detects a change in said intensity indicating a converging of said substrates, and a consequent compression of said carrier medium, at or above an extent indicative of a severe impact of said vehicle.

2. A method for detection of an impact against a vehicle and providing a response comprising the steps of providing a vehicle having incorporated therein a deformation sensor within a crush zone of said vehicle and communicating between said sensor and an occupant restraint system when said sensor detects a severe impact, characterized by the steps of:
   a) providing a deformation sensor as defined in claim 1 within said vehicle linking two substrates within the crush zone of said vehicle;
   b) transmitting light from a source to a light-transparent deformable carrier medium (2) having light scattering centers evenly disbursed throughout, to form an optical cavity defined by a region with said medium within which light from said source is fully scattered;
   c) detecting the intensity of fully scattered and integrated light within said optical cavity and transmitting a resulting signal to signal processing means;
   d) converting within said signal processing means (10) said resulting signal into an output electrical signal;
   e) actuating an occupant restraint system (124, 126) upon detection fo a change in said integrated light intensity within said optical cavity indicative of converging together of said substrates by an extent indicative of a severe impact experienced by said vehicle.

3. A sensor as defined in claim 1, wherein said wave energy source and receiver comprise respectively a source and receiver of visible light.

4. A sensor as defined in claim 3, wherein said wave energy source and receiver comprise respectively a fiber optic light source and receiver.

5. A sensor as defined in claim 4 wherein said light source and receiver comprise a generally linear array (16) of pairs of light sources and receivers respectively.

6. A sensor as defined in claim 3, wherein said light source and receiver comprise an LED and photo receptor (154), respectively, mounted to a circuit board (152) in contact with said carrier medium.

7. A sensor as defined in claim 3 wherein said light source and receiver comprise a generally linear array (16) of pairs of light sources and receivers respectively.

8. A vehicle having integrated therein a collision detector within a crush zone of said vehicle, said crush zone comprising a first substrate (28) at the periphery of said vehicle and a second substrate (26) spaced apart from and inboard of said first substrate, and sensor means between said first and second substrates to detect convergence of said first and second substrates indicative of crushing of said crush zone, characterized by said sensor means comprising:
   a) a compressible carrier medium (2) of wave energy transmitting material having wave energy scattering centers disbursed within said carrier medium;
   b) a wave energy source (4, 6) coupled to the carrier medium to create a scattered energy volume containing fully scattered wave energy;
   c) a wave energy receiver (8) responsive to an intensity of said fully scattered wave energy; and
   d) signal coupling means (10) to operatively connect said receiver with signal processing means for triggering said occupant restraint system when said receiver detects a change in said intensity indicating a converging of said substrates, and a consequent compression of said carrier medium indicative, at or above an extent indicative of a severe impact of said vehicle.

9. A vehicle as defined in claim 8, wherein said wave energy source and receiver comprise respectively a source and receiver of visible light.

10. A vehicle as defined in claim 7, wherein said energy source and receiver comprise respectively a fiber optic light source and receiver.

11. A vehicle as defined in claim 10, wherein said light source and receiver comprise a generally linear array (16) of pairs of light sources and receivers.

12. A vehicle as defined in claims 7, wherein said light source and receiver comprise a generally linear array (16) of pairs of light sources and receivers.

13. A vehicle as defined in claim 9, wherein said light source and receiver comprise an LED and photo receptor (154), respectively, mounted to a circuit board (152) in contact with said carrier medium.

14. A vehicle as defined in claim 8, wherein said first substrate comprises a bumper skin (28) and said second substrate comprises a bumper armature (26), said carrier medium comprising a compressible foam material (2) at least partly filling the space between said armature and skin.

15. A vehicle as defined in claim 8, wherein said first substrate comprises a door panel skin (44) said second substrate comprising a door panel support structure (42) spaced apart from said support structure, the interior volume therebetween substantially filled with said carrier medium (2).

16. A vehicle as defined in claim 8, wherein said first substrate comprises a portion of a vehicle skin (44), and said second substrate comprises a portion of a vehicle frame (42) spaced apart from said frame, said carrier medium comprising compressible foam at least partly filling said space between said frame and skin.

17. A vehicle as defined in claim 8, said first substrate comprising a first component of a vehicle structural frame element (52) and said second substrate comprising a second component of said frame element, said first and second components defining an interior volume therebetween substantially filled with said carrier medium.

18. A vehicle as defined in any of claim 13–17 or 8–12 wherein said carrier medium comprises an energy absorbing foam material.

* * * * *